US007587848B2

(12) United States Patent
Wilson

(10) Patent No.: US 7,587,848 B2
(45) Date of Patent: Sep. 15, 2009

(54) KEY IDENTIFICATION SYSTEM AND FORM FITTING LABEL AND METHOD OF MANUFACTURE

(76) Inventor: James C. Wilson, 300 N. Prescott Ave., Clearwater, FL (US) 33755

( * ) Notice: Subject to any disclaimer, the term of this patent is extended or adjusted under 35 U.S.C. 154(b) by 230 days.

(21) Appl. No.: 10/550,944

(22) PCT Filed: Aug. 3, 2005

(86) PCT No.: PCT/US2005/027794

§ 371 (c)(1),
(2), (4) Date: Sep. 28, 2005

(87) PCT Pub. No.: WO2006/065290

PCT Pub. Date: Jun. 22, 2006

(65) Prior Publication Data

US 2006/0265917 A1 Nov. 30, 2006

Related U.S. Application Data

(60) Provisional application No. 60/637,207, filed on Dec. 17, 2004.

(51) Int. Cl.

| | |
|---|---|
| ***A44B 15/00*** | (2006.01) |
| ***G09F 15/00*** | (2006.01) |
| ***G09F 3/00*** | (2006.01) |
| ***B29C 65/00*** | (2006.01) |
| ***B32B 37/00*** | (2006.01) |
| ***A45C 11/32*** | (2006.01) |
| ***E05B 65/48*** | (2006.01) |
| ***E05B 19/24*** | (2006.01) |

(52) U.S. Cl. ............................ 40/634; 40/330; 156/86; 206/37.1; 70/7; 70/460; 70/456 R

(58) Field of Classification Search .................. 40/634, 40/330; 156/86; 206/37.1; 70/7, 460, 456 R
See application file for complete search history.

(56) References Cited

U.S. PATENT DOCUMENTS

| | | | |
|---|---|---|---|
| 1,485,075 | A | 2/1924 | Gumaer |
| 1,794,498 | A | 3/1931 | Ridgway |
| 1,837,114 | A | 12/1931 | Cicourel |
| 1,868,563 | A | 7/1932 | Cicourel |
| 1,897,861 | A | 2/1933 | Quay |
| 1,966,550 | A | 7/1934 | Handy |

(Continued)

OTHER PUBLICATIONS

"Royal Canadian Mounted Police Security Systems Branch Protective Policing Directorate" Ottawa, Ontario K1A OR 2, Mar. 1991.

(Continued)

*Primary Examiner*—Lesley D Morris
*Assistant Examiner*—Syed A Islam

(57) ABSTRACT

A colored heat-shrinkable label and labeling system including a key label and a lock label having a substantially cylindrical sleeve having an inner surface and an outer surface and formed of a colored heat shrink material of a size to fit around a head end of a key and a portion of a lock and to be shrunk to substantially encase the head end of the key (12), and a portion of a lock, forming a flat surface that can be written upon.

The key label and the lock label being color coded to indicate that the key and the lock are associated with each other.

1 Claim, 2 Drawing Sheets

U.S. PATENT DOCUMENTS

| | | | | |
|---|---|---|---|---|
| 2,109,268 | A | 2/1938 | I'Anson | |
| 2,138,309 | A | 11/1938 | Stevenson | |
| 2,173,752 | A | 9/1939 | Carrington | |
| 2,349,745 | A | 5/1944 | Morris | |
| 2,432,498 | A | 12/1947 | Bloomfield | |
| 2,932,107 | A | 4/1960 | Manzardo | |
| 2,982,041 | A * | 5/1961 | Kent | 40/330 |
| 2,988,836 | A | 6/1961 | Oberfield | |
| 3,123,926 | A | 3/1964 | Jacobson | |
| 3,225,478 | A | 12/1965 | Rohmer | |
| 4,608,323 | A * | 8/1986 | Zaborney | 429/167 |
| 5,113,602 | A | 5/1992 | Levine et al. | |
| 6,000,258 | A * | 12/1999 | Lesko | 70/460 |
| 6,938,771 | B2 * | 9/2005 | Friedrich et al. | 206/497 |
| 2003/0188467 | A1 | 10/2003 | Truelsen | |
| 2004/0045197 | A1 | 3/2004 | Tomsich | |

OTHER PUBLICATIONS

Key Tags/Identifiers, pp. LU-01, 3, 4, 5 Dec. 17, 2004.
IDN Canada Lucky Line Products, two pages Dec. 17, 2004.

* cited by examiner

KEY IDENTIFICATION SYSTEM AND FORM FITTING LABEL AND METHOD OF MANUFACTURE

CROSS-REFERENCE TO RELATED APPLICATION

This application claims the benefit of U.S. Provisional Patent Application No. 60/637,207, filed Dec. 17, 2004, which is hereby incorporated by reference in its entirety herein.

FIELD OF THE INVENTION

The present invention relates generally to labels, and more particularly to form-fitting labels for a key, a lock and the like.

BACKGROUND

Conventional key labels, for example, metal-rimmed paper disks, are often attached to keys with key rings. Unfortunately, these labels usually do not work well, especially when the key and label are placed on a key ring or holder because they are cumbersome and when the label becomes detached from the key ring the original problem of not knowing what the key is for returns.

Another type of conventional key label, for example, key head covers, are designed to fit a limited number of key head shapes, but to not work well for all shapes of key heads. Specifically, once installed, key head covers do not allow for easy placement of the key on a key ring or holder because the key head cover either interferes with the keyhole or with the placement of the key and head cover on the key ring and makes the key ring bulky. Further, with loose fitting ring type covers a key is prone to becoming separated from the ring type cover.

Adhesive labels have also been used as key labels, but are inadequate because they require relatively large areas of flat surface to which to affix. Further, adhesive labels tend to become detached as a result of the day-to-day use and handling of the key and because common adhesives do not adhere to metal keys well.

SUMMARY OF THE INVENTION

The present invention avoids the disadvantages of conventional key labels by reliance on the use of a heat shrinkable material in the form of a cylindrical sleeve that is adapted to be placed over the head of a key and heat shrunk so that it tightly envelops the key head. The cylinder may be of selected diameter and width, according to the size of the key head and may be configured to ensure that it does not obstruct a key ring opening and interfere with placement on a key ring.

BRIEF DESCRIPTION OF THE DRAWINGS

The convention will be more readily understood by reference to the following drawings wherein like reference characters represent like parts throughout the several views.

DETAILED DESCRIPTION

Figure 1:
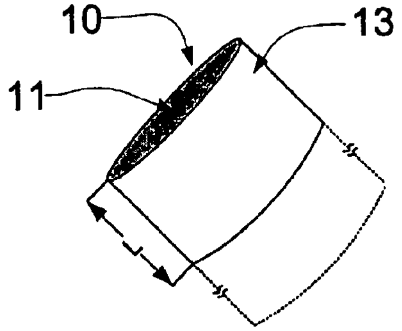
FIG. 1 is a perspective view of a key label, in accordance with an embodiment of the present invention.
Figure 2:
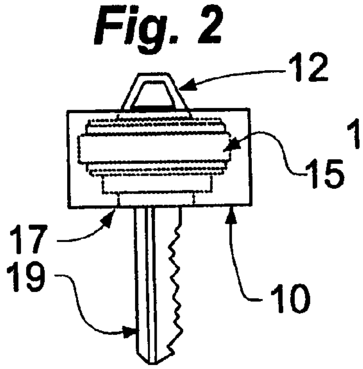
FIG. 2 is a front elevational view showing the placement of the key label of FIG. 1 around a key head prior to shrinking of the key label, in accordance with an embodiment of the present invention.

Referring to the drawings, and in particular to FIG. 1, there is illustrated a perspective view of a key label 10, in accordance with an embodiment of the present invention. Key label 10 is advantageously formed of a colored heat shrink material in a substantially cylindrical shape in a variety of predetermined diameters or a substantially predetermined molded shape to correspond closely to the shape of a key head and may be trimmed to a length L which, generally, would be less than the length of the key head to be labeled. For example, in some embodiments length L may range from about ⅛" to 1", more or less. However, this range is not intended to limit the possible sizes, but rather is merely illustrative of select embodiments, and embodiments with lengths both less than ⅛" and greater than 1" are also contemplated. The cut section of 10 is of a flexible material that enables it to be compressed or flattened by hand to allow it to pass over a key head, as shown in FIG. 2. As shown in FIGS. 1 and 2, the width, when the material is compressed, is less than the length. Described otherwise, approximately one half of the circumference is greater than the Length, L. It will be appreciated that label 10 may be cut from an elongated tubular member, flattened into a sleeve shape for packaging and distribution. Key label 10 includes an inner surface 11 and an outer surface 13 and may be formed from a colored heat shrink material such as polyolefin, polyvinyl chloride, polytetrafluoroethylene (sold under the trade name Teflon), polychloroprene (sold under the trade name Neoprene), or the like. In addition, key label 10 may be colored (for example, white, red, blue, green, yellow, or other color), preprinted with identifying information, formed with a flat surface so as to be written on. Alternatively, key label 10 may be formed into a substantially rectangular sleeve with two pairs of opposing walls, such that the inner perimeter of the walls measured on inner surface 11 may be approximately the same as the outer surface dimensions of the key head to which it is to be applied. In yet other alternatives, key label 10 may be formed into a variety of different geometric shapes that approximate the shape of the key heads and/or items to which they are to be applied. In still other alternatives, a heat activated adhesive may be applied to inner surface 11 of key label 10 to aid in the permanent affixation of key label 10 to the surface of the key head.

In general, to apply key label 10 to an item, key label 10 is first deformed slightly and slipped over a substantially flat portion of the key head. Next, if necessary, key label 10 may be held in place with pliers, tweezers, a clothespin, or a like label-holding device. Alternatively, key label 10 may be held in place by friction between inner surface 11 and an outer surface of the key head and/or with a label-holding device. Next, sufficient heat is applied to key label 10 causing it to shrink and conform to the outline of the key head. Finally, a suitable mark or identification may be placed on key label 10 by stamping or using a permanent pen such as, for example, a Sharpie Industrial marking pen, or other permanent writing implement.

FIG. 2 is an elevational view showing the placement of the key label of FIG. 1 around a key head prior to shrinking of the key label, in accordance with an embodiment of the present invention. In particular, key label 10 is placed around a key head 15 of a key 12 prior to shrinking. Key label 10 may be formed as a flattened cylindrical sleeve, which may facilitate sliding key head 15 of key 12 into key label 10. Key label 10 also may be formed in different sizes to accommodate various shapes and sizes of key heads.

Figure 3:
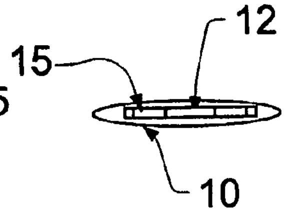
FIG. 3 is a top view showing the placement of the key label of FIG. 1 around a key head prior to shrinking of the key label, in accordance with an embodiment of the present invention.

FIG. 3 is a top view showing the placement of the key label of FIG. 1 around a key head prior to shrinking of the key label, in accordance with an embodiment of the present invention. In FIG. 3, although key label 10 is shown to not be in contact with key head 15, key label 10 may be sized so that it frictionally contacts one or more edges and/or surfaces of key head 15. If key label 10 frictionally contacts the edges and/or surfaces of key head 15, key label 10 may be heat shrunk to key head 15 without having to hold key label 10 and key 12/key head 15 together.

Figure 4:
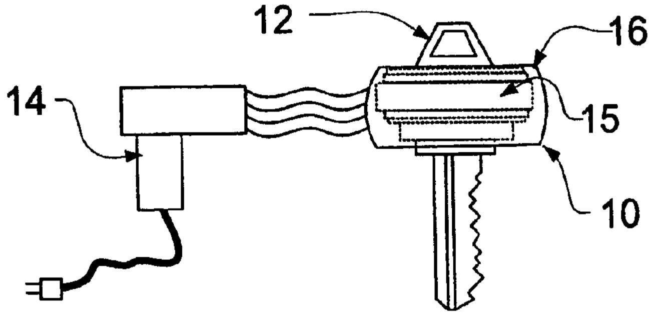
FIG. 4 is a front elevational diagrammatic view showing a heat shrinking process for attaching a key label to a key, in accordance with an embodiment of the present invention.

FIG. 4 is a front view showing a heat shrinking process for attaching a key label to a key head, in accordance with an embodiment of the present invention. As shown in FIG. 4, heat from a suitable heat source 14 such as, for example, a hair dryer or heat gun, may be applied to key label 10. As heat is applied to key label 10, there results a partially shrunk key label 16 around key head 15. With continued application of heat from heat source 14, partially shrunk key label 16 may continue to shrink around and conform to the shape of key head 15 of key 12.

Figure 5:
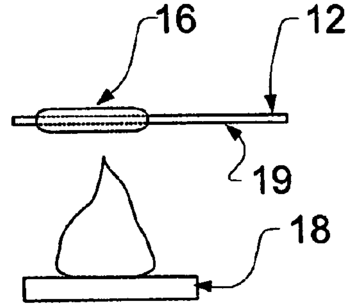
FIG. 5 is a side diagrammatic view showing an alternative heat shrinking process for attaching a key label to a key, in accordance with another embodiment of the present invention.

FIG. 5 is a side view showing an alternative heat shrinking process for attaching a key label to a key, in accordance with another embodiment of the present invention. In FIG. 5, key 12 and partially shrunk key label 16 may be heated by a flame 18 either directly or through a screen/barrier (not shown) to prevent the burning and/or discoloration/deformation of key label 10.

While heat gun 14 and flame 18 are shown in FIGS. 4 and 5, it should be appreciated that other heat sources may also be used, such as a gas flame source (for example, butane, propane, or other gas), an electric heat source (for example, a heat gun, an iron, a burner, or the like), a heated fluid (for example, hot air or liquid), a solid fuel (for example, a canned heat cooking fuel), or the like. Regardless of the heat source, the heat may be applied to the key label until the key label has shrunk to fit the form of the head end of the key. Once the key label has been shrunk and cooled, suitable marking or identification may be applied to its surface 25. To this end key label 10 is made of an appropriate material that permits writing and/or affixation on the label as desired.

Figure 6:
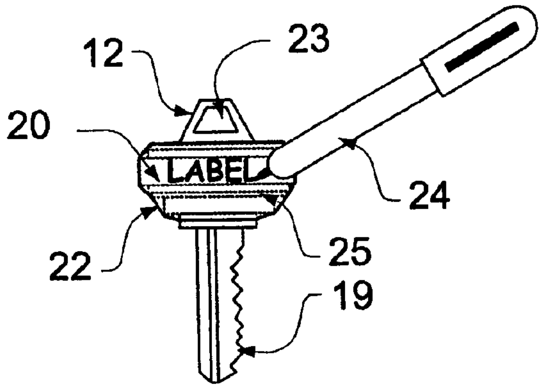
FIG. 6 is a front elevational and diagrammatic view of a key, which has had a label attached thereto and being labeled or identified by a marking device, in accordance with an embodiment of the present invention.

FIG. 6 shows a key label 10 attached to a key head 15 with surface 25 being labeled by being written on, in accordance with an embodiment of the present invention. In particular, a fully shrunk key label 22 is shown fitting around the head end of key 12. It should be noted that a keyhole 23 of key 12 has been left exposed to allow key 12 to be placed on a key ring or holder, while key cuts on shank 19 are also clear of the sleeve. A prepunched hole in the key label may also be provided to allow for key ring holes. A writing implement 24 is shown being used to place a writing 20 on fully shrunk key label 22. The writing implement 24 may be, for example, a pencil, pen, marker, permanent marker, or the like. However, to provide extended durability of writing 20, using a permanent marker to apply writing 20 is suggested.

It should be appreciated that in addition to, or instead of, being able to be written on, fully shrunk key label 22 may be preprinted with label names and/or symbols. If fully shrunk key label 22 is preprinted, the label names and/or symbols may be slightly over-sized and/or distorted to allow for size and shape changes when key label 10 shrinks around the head end of key 12. Alternatively, fully shrunk key label 22 may be at least partially transparent to allow the surface of the key to be written on and/or to permit a label to be placed between key 12 and key label 10 to be visible from beneath fully shrunk key label 22.

Figure 7:
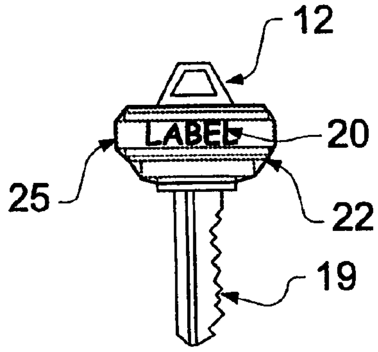
FIG. 7 is a front elevational view of the key label of FIG. 6 after being labeled by the marking device, in accordance with an embodiment of the present invention.

FIG. 7 shows the key label of FIG. 6 after being labeled, in accordance with an embodiment of the present invention. In particular, fully shrunk key label 22 has been shrunk to closely fit the form of the head end of key 12 and writing 20 has been applied to fully shrunk key label 22. Fully shrunk key label 22 may be trimmed after it has been applied to remove any excess shrunk label material. Alternatively, fully shrunk key label 22 may be trimmed prior to heat shrinking.

Figure 8:
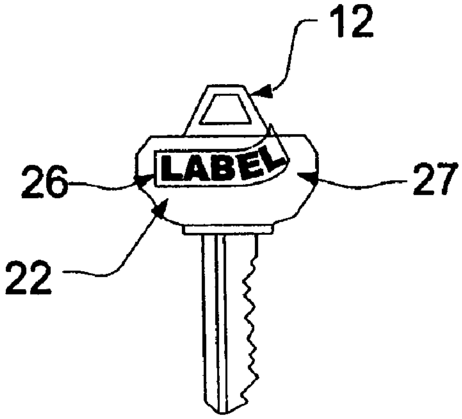
FIG. 8 is a front view of attaching a standard preprinted adhesive label to the face of a key label that is already attached to a head end of a key, in accordance with an embodiment of the present invention.

FIG. 8 is a front view of attaching a standard preprinted adhesive label to the face of a key label that is already attached to a head end of a key, in accordance with an embodiment of the present invention. In FIG. 8, a fully shrunk key label, for example, fully shrunk key label 22 of FIG. 6, is shown having a preprinted adhesive label 26 being affixed to a front surface 27 of fully shrunk key label 22. Front surface 27 of fully shrunk key label 22 provides an adhesive-friendly surface for the adhesive label to properly affix thereto.

In addition to key labels, form-fitting labels made of heat shrink material in accordance with the present invention may also be used to label locks and, in particular, pad locks. The heat shrink sleeves may be placed around lock bodies, especially pad locks or the shackle of pad locks, to enable labeling. The heat shrink labels for locks are applied in a manner similar to that used for key labels. Further, the key labels and lock labels may be color-coded, for example, so that the color of the key labels and the lock labels match each other for convenient association of a key with a lock that the key opens.

Figure 9:
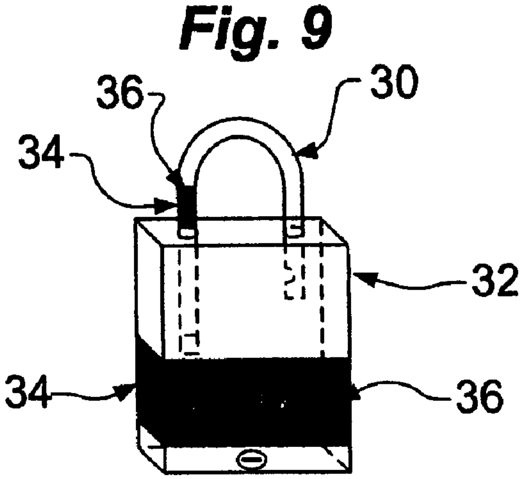
FIG. 9 is a front-perspective view of alternative and/or jointly used labels already applied to a lock and labeled, in accordance with embodiments of the present invention.

FIG. 9 is a front-perspective view of alternative labels already applied to a lock and labeled, in accordance with an embodiment of the present invention. In FIG. 9, a lock 32 has affixed around a portion of its middle a heat shrink label 34 with a mark or identification 36 applied thereon to which could indicate which similarly labeled key applies to lock 32. Conveniently, in this type of lock, a preprinted identification label may be placed beneath a transparent heat shrink label 34. Alternatively, a shackle 30 of lock 32 may have a label 34 with lettering 36 affixed thereto.

As is apparent from the above description and the figures referenced therein, there is provided a form fitting key label in accordance with the present invention. While this invention has been described in conjunction with a number of embodiments, it is evident that many alternatives, modifications and variations would be or are apparent to those of ordinary skill in the applicable arts. Accordingly, applicant intends to embrace all such alternatives, modifications, equivalents and variations that are within the spirit and scope of this invention.

What is claimed is:

1. A labeling system comprising: a key label including a first substantially cylindrical sleeve of a colored heat shrink material having a first predetermined diameter, a first predetermined length, and a first circumference, an inner surface and an outer surface, such that the inner surface of the key label is adapted to fit around a head end of a key and be shrunk to substantially encase the head end of the key forming a flat surface that can be written upon, the first substantially cylindrical sleeve having a through opening to fit around the head end of the key and be shrunk to substantially encase the head end of the key, the length of the material being less than one half of the first circumference of the material, the first length being between about ⅛ inch and 1 inch; and a lock label including a second substantially cylindrical sleeve of a colored heat shrink material having a second predetermined diameter, a second predetermined length, an inner surface and an outer surface and a through opening such that the inner surface of the lock label is adapted to fit around a portion of a lock and be shrunk to substantially encase the portion of the lock forming a flat surface that can be written upon;

The key label and the lock label being color coded to indicate that the key and the lock are associated with each other.

* * * * *